United States Patent
Cao et al.

(10) Patent No.: US 10,016,700 B2
(45) Date of Patent: Jul. 10, 2018

(54) MULTIFUNCTIONAL CONTINUOUS PHASE TRANSITION EXTRACTION APPARATUS

(71) Applicant: Yong Cao, Guangzhou, Guangdong (CN)

(72) Inventors: Yong Cao, Guangdong (CN); Weijie Dai, Gunagdong (CN); Hancha Liu, Guangdong (CN); Yong Zhang, Guangdong (CN); Xiaosheng Guan, Guangdong (CN); Hong Xu, Guangdong (CN); Fei Liu, Guangdong (CN)

(73) Assignee: Yong Cao (CN)

( * ) Notice: Subject to any disclaimer, the term of this patent is extended or adjusted under 35 U.S.C. 154(b) by 271 days.

(21) Appl. No.: 14/902,908

(22) PCT Filed: Jul. 11, 2014

(86) PCT No.: PCT/CN2014/082107
§ 371 (c)(1),
(2) Date: Jan. 5, 2016

(87) PCT Pub. No.: WO2015/010551
PCT Pub. Date: Jan. 29, 2015

(65) Prior Publication Data
US 2016/0220923 A1   Aug. 4, 2016

(30) Foreign Application Priority Data

Jul. 22, 2013 (CN) .......................... 2013 1 0306553
Jul. 22, 2013 (CN) ...................... 2013 2 0434302 U

(51) Int. Cl.
*B01D 11/02* (2006.01)
*B01D 11/04* (2006.01)
(Continued)

(52) U.S. Cl.
CPC ............ *B01D 11/0296* (2013.01); *B01D 3/06* (2013.01); *B01D 3/143* (2013.01);
(Continued)

(58) Field of Classification Search
CPC ............ B01D 11/0284; B01D 11/0296; B01D 11/0488; B01D 3/06; B01D 3/143; C11B 1/04; C11B 1/10; A24B 15/24
See application file for complete search history.

(56) References Cited

U.S. PATENT DOCUMENTS

| 1,762,785 A | * | 6/1930 | Little | ................. | B01D 11/0215 |
| | | | | | 530/202 |
| 4,743,282 A | * | 5/1988 | Mehra | ...................... | C07C 7/11 |
| | | | | | 62/625 |

(Continued)

FOREIGN PATENT DOCUMENTS

| CN | 1454694 A | 11/2003 |
| CN | 200960414 Y | 10/2007 |

(Continued)

OTHER PUBLICATIONS

International Search Report for Application No. PCT/CN2014082107 dated Oct. 14, 2014.

*Primary Examiner* — Jonathan Miller
*Assistant Examiner* — Gabriel E Gitman
(74) *Attorney, Agent, or Firm* — Lerner, David, Littenberg, Krumholz & Mentlik, LLP

(57) ABSTRACT

A multifunctional continuous phase transition extraction apparatus comprises an extraction system, a desorption system and a solvent recovery system. The extraction system comprises a first heat exchanger and an extraction tank. The desorption system comprises a second heat exchanger, a first desorption tank, a second desorption tank, a first purification column and a second purification column. The solvent recovery system comprises a first condenser, a second (Continued)

condenser, a first solvent tank and a second solvent tank. Two extraction loops can be formed in the present invention. During the overall extraction process, the phase transition process of the extracting agent is real-time and continuous. The extracting agent goes through continuous phase-transitions and is cyclically re-used. The overall process is operated in an airtight and low-pressure condition, and is multifunctional, safe, reliable, and suitable for the extraction for most natural products.

10 Claims, 1 Drawing Sheet

(51) Int. Cl.
    *C11B 1/10*      (2006.01)
    *B01D 3/06*      (2006.01)
    *B01D 3/14*      (2006.01)
    *C11B 1/04*      (2006.01)

(52) U.S. Cl.
    CPC ...... *B01D 11/0284* (2013.01); *B01D 11/0488* (2013.01); *C11B 1/04* (2013.01); *C11B 1/10* (2013.01); *C11B 1/108* (2013.01)

(56) References Cited

U.S. PATENT DOCUMENTS

| | | |
|---|---|---|
| 5,013,443 A | 5/1991 | Higashidate et al. |
| 5,026,549 A | 6/1991 | Coutiere |
| 6,207,044 B1 * | 3/2001 | Brimhall .................. B01D 3/06 208/14 |
| 2008/0134837 A1 * | 6/2008 | Wai .......................... C22B 3/02 75/396 |

FOREIGN PATENT DOCUMENTS

| | | |
|---|---|---|
| CN | 101642632 A | 2/2010 |
| CN | 201799133 U | 4/2011 |
| CN | 102258882 A | 11/2011 |
| CN | 103173275 A | 6/2013 |
| CN | 103173279 A | 6/2013 |
| CN | 103349849 A | 10/2013 |
| CN | 203447813 U | 2/2014 |
| JP | 2003211143 A | 7/2003 |
| WO | 2008026446 A1 | 3/2008 |

\* cited by examiner

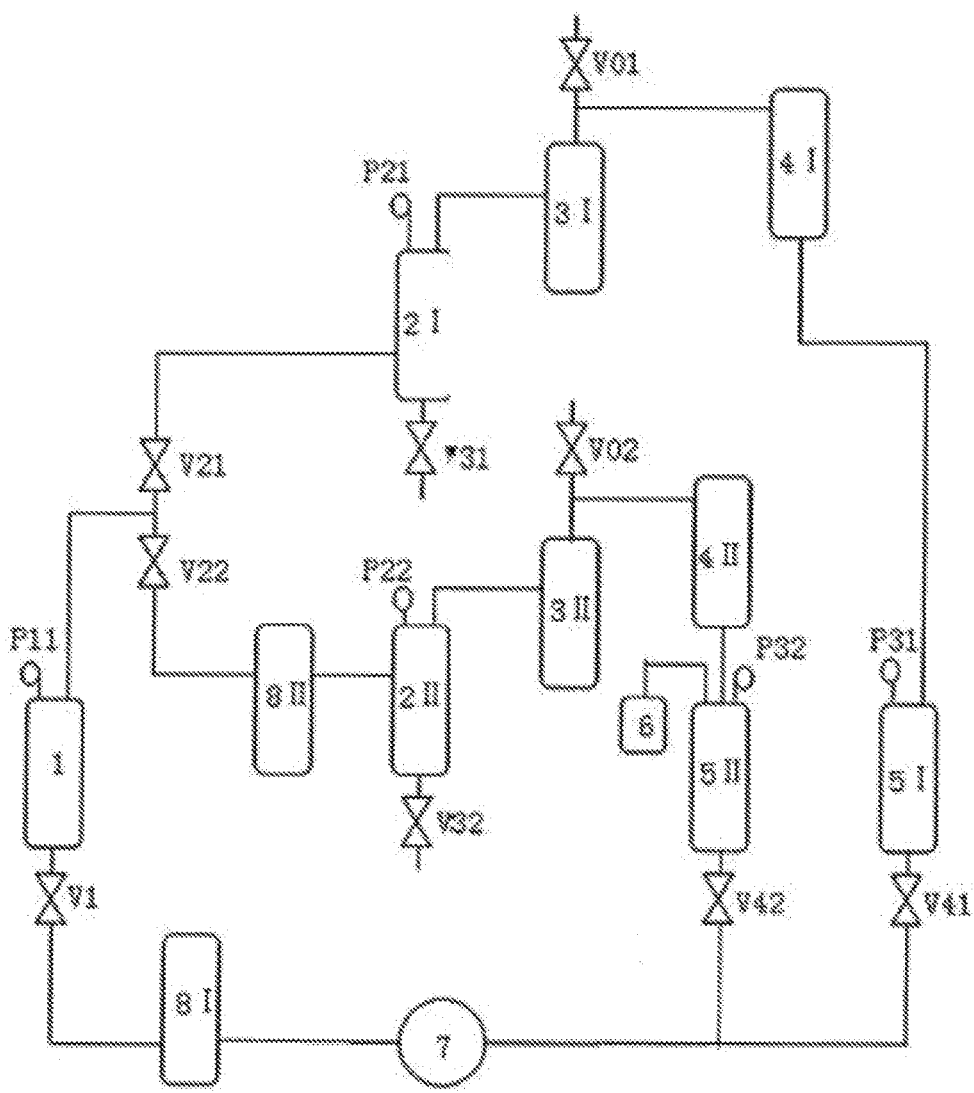

MULTIFUNCTIONAL CONTINUOUS PHASE TRANSITION EXTRACTION APPARATUS

CROSS-REFERENCE TO RELATED APPLICATIONS

The present application is a national phase entry under 35 U.S.C. § 371 of International Application No. PCT/CN2014/082107 filed Jul. 11, 2014, which claims priority from Chinese Application Nos. 201310306553.5 filed Jul. 22, 2013 and 201320434302.0 filed Jul. 22, 2013, all of which are hereby incorporated herein by reference.

TECHNICAL FIELD

The invention relates to the technical field of the extraction separation, and to a new apparatus of multifunctional continuous phase transition extraction in extraction separation.

BACKGROUND

Normally, the common methods for extraction of the natural products are solvent leaching, reflux extraction, supercritical $CO_2$ extraction, subcritical extraction, etc. The solvent leaching is widely used because of its low cost, simple equipment and wide application scope, but it still has some disadvantages such as low efficiency in extraction and inconvenience in filtrating after extraction and recycling solvents. The reflux extraction, such as the hot reflux high-pressure extracting-vacuum concentrating process, as disclosed in the Chinese patent with Publication No.: CN1454694A, can complete the processes of extracting, filtrating and concentrating at the same time. But the apparatus of reflux extraction adopts spray design with only 0.1 MPa maximum pressure, has limited kinds of solvents for use and limited improvement in efficiency. The supercritical extraction, such as the supercritical CO2 fluid extracting device, as disclosed in the Chinese patent with Publication No.: CN201799133U, is environment-friendly, uses cheap and easily available solvents, and has a better separation. But it has some significant disadvantages. First, the extraction has a good performance only in separating the nonpolar substance, but has a poor one in separating the polar substance. Second, the extraction must be processed in over 20 MPa super high pressure, which limits the amplification of equipment volume. Third, the extraction has high cost in equipment manufacture and maintenance, which limits the development of this technology and thus its application is limited. The subcritical extraction, such as subcritical extraction devices and methods for active ingredients of natural products, as disclosed in the Chinese patent with Publication No.: CN101642632A, conducts under pretty low temperature and pressure condition, and can flexibly choose different subcritical extraction media according to the different objects to be extracted. But it is time-consuming, needs a high amount of solvents, and operates intermittently likes conventional solvent extractions. The subcritical fluid dynamic extraction apparatus disclosed in the Chinese Patent with Publication No.: CN102258882A, which were developed from the subcritical extraction devices and methods for active ingredients of natural products disclosed in the Chinese patent with Publication No.: CN101642632A, overcomes the disadvantage of intermittent operation, has good extraction effect only for nonpolar substances but not for polar ones. Therefore, it is urgently needed for an extraction device which is effective for both non-polar and polar substances, high efficient, low cost and ready for industrialization.

SUMMARY OF THE INVENTION

The aim of this invention is to provide a multifunctional continuous phase transition extraction apparatus. It has a broad application scope for solvent extraction and possesses continuous and safe properties of the supercritical dynamic extraction. It has lower equipment and operation cost than supercritical extraction, can realize industrialization and achieve extraction of natural products in all aspects with high efficiency.

To achieve the aim, the technical solutions of this invention are:—a multifunctional continuous phase transition extraction apparatus, comprising an extraction system, a desorption system and a solvent recovery system, the extraction system comprising a first heat exchanger and an extraction tank, wherein the first heat exchanger and the extraction tank are connected in series by a connecting pipe on which a valve is disposed; said desorption system comprising a second heat exchanger, a first desorption tank, a second desorption tank, a first purification column and a second purification column, wherein the second heat exchanger and the first desorption tank are connected in parallel to the extraction tank, the second desorption tank is connected with the second heat exchanger, the first purification column is connected with the first desorption tank, the second purification column is connected with the second desorption tank, a first bottom valve and a second bottom valve are disposed at the bottom of the first desorption tank and the second desorption tank, a first pressure control valve is disposed on the pipe connecting the first desorption tank and the extraction tank, and a second pressure control valve is disposed on a pipe connecting the second heat exchanger and the extraction tank; said solvent recovery system comprising a first condenser, a second condenser, a first solvent tank and a second solvent tank, wherein the first solvent tank and the second solvent tank are connected in parallel to the first heat exchanger, a high-pressure pump is disposed on the pipe connecting the first heat exchanger with the first solvent tank and the second solvent tank, the first condenser is connected with the first solvent tank, the second condenser is connected with the second solvent tank, a first valve and a second valve are respectively disposed on the pipes connecting the high-pressure pump with the first solvent tank and the second solvent tank.

A liquid ring vacuum pump is disposed on the second solvent tank, so as to use solvents with higher boiling point for extraction.

A plurality of the extraction tanks having heating jackets can be disposed in series or parallel.

A plurality of the first desorption tank and the second desorption tank can be disposed in parallel. The first desorption tank and the second desorption tank have heating jackets structure or heating pipe inside or external circulating heater.

A plurality of the first purification column and the second purification column can be disposed in series or parallel. The upper parts of the first purification column and the second purification column respectively have a first blow valve and second blow valve.

A plurality of the first condenser and the second condenser can be disposed in series or parallel with each other. A plurality of the first solvent tank and the second solvent tank can be disposed in series or parallel with each other.

The upper parts of the first purification column and the second purification column have packing layers which are stainless steel wire mesh, and the lower parts of the first purification column and the second purification column are cavities equipped with sight glasses.

Pressure vacuum gauges are disposed respectively on the extraction tank, the first desorption tank, the second desorption tank, the first solvent tank and the second solvent tank.

The invention is a new multifunctional, high efficient and dynamic extraction apparatus. The apparatus has two extraction circuits. One circuit is for the solvents which are in liquid state under normal temperature and normal pressure. The other is for the solvents which are in gas state under normal temperature and normal pressure. The solvents are circulating constantly in the circuits during the process of extraction.

After the material is filled into the extraction tank of the continuous phase transition extraction apparatus, always under the condition of lower than critical pressure and temperature of the extraction solvent, the extraction solvent is pressurized to flow through the extraction tank with a certain flow rate from bottom to top. After extraction and after entering into the desorption tank, the extraction solvent is heated and depressurized so as to turn into gas state. And then the gas solvent is turned into liquid state through instant cooling and pressurization. The liquid solvent flows through the extraction tank to extract the material again. During the whole process, the phase transition of extraction solvents from liquid to gas and then to liquid is instant and continuous. The extraction solvents carry out continuous phase transition and are cyclically re-used. And the extracted substance is stored in the desorption tanks and collected after completion of the extraction. The solvents could be low polar solvents such as propane, n-butane, liquefied petroleum gas, etc., and could also be middle and high polar solvents such as acetone, ethyl acetate, ethanol, methanol and water, etc. The extraction is very efficient because the solvents entering into the extraction tanks are pure at any time, which can maximize the extraction.

Technical Effect

1. During the whole process, the phase transition process from liquid to gas and then to liquid of extraction solvents is instant and continuous. Extraction solvents can carry out continuous phase transition, and can be cyclically re-used and pure. And the extracted substance is stored in the desorption tanks and collected when the extraction is completed.

2. Extraction solvents can be promptly recovered during the process of extraction. Therefore, comparing others extraction methods, the amount of solvents used is less under the condition that the amount of material to be extracted is the same, and comparing others extraction methods, the amount of material treated is more if the volume of extraction tank is the same.

3. All kinds of polar solvents such as propane, n-butane, liquefied petroleum gas, acetone, ethyl acetate, ethanol, methanol and water can be used.

4. It is safe and reliable because the whole process is conduct in the closed and low pressure system.

5. The apparatus is multifunctional, high efficient, and applicable to the extraction of most of natural products. It overcomes the traditional disadvantage of intermittent operation.

BRIEF DESCRIPTION OF THE DRAWINGS

FIGURE is the structure schematic of the apparatus system in the invention.

DETAILED DESCRIPTION OF THE INVENTION

As shown in the FIGURE, a multifunctional continuous phase transition extraction system apparatus comprises an extraction system, a desorption system and a solvent recovery system.

The extraction system comprises a first heat exchanger 8 I and an extraction tank 1. The first heat exchanger 8 I and the extraction tank 1 are connected in series by connecting pipes. A valve V1 is disposed on the connecting pipe.

The desorption system comprises a second heat exchanger 8 II, a first desorption tank 2 I, a second desorption tank 2 II, a first purification column 3 I and a second purification column 3 II. The second heat exchanger 8 II and the first desorption tank 2 I are connected in parallel to the extraction tank 1. The second desorption tank 2 II is connected to the second heat exchanger 8 II. The first purification column 3 I is connected to the first desorption tank 2 I. The second purification column 3 II is connected to the second desorption tank 2 II. The upper parts of the first purification column 3 I and the second purification column 3 II respectively have a first blow valve V01 and a second blow valve V02. The pipe connecting the second heat exchanger 8 II and the extraction tank 1 has a second pressure control valve V22. The pipe connecting the first desorption tank 2 I and the extraction tank 1 has the first pressure control valve V21. The first desorption tank 2 I and the second desorption tank 2 II have heating jackets structure or heating pipe inside or external circulating heater. There are a first bottom valve and a second bottom valve at the bottom of the first desorption tank 2 I and the second desorption tank 2 II.

The solvent recovery system comprises a first condenser 4 I, a second condenser 4 II, a first solvent tank 5 I and a second solvent tank 5 II. The first solvent tank 5 I and the second solvent tank 5 II are connected in parallel to the first heat exchanger 8 I. The pipes connecting the first solvent tank 5 I and the second solvent tank 5 II with the first heat exchanger 8 I have a high-pressure pump 7. The first condenser 4 I is connected to the first solvent tank 5 I. The second condenser 4 II is connected to the second solvent tank 5 II. The second solvent tank 5 II has a liquid ring vacuum pump 6. The pipes connecting the first solvent tank 5 I and the second solvent tank 5 II with the high-pressure pump 7 respectively have a first valve V41 and a second valve V42. The extraction tank 1, the first desorption tank 2 I, the second desorption tank 2 II, the first solvent tank 5 I and the second solvent tank 5 II have pressure vacuum gauges P11, P21, P22, P31, P32 respectively.

In order to improve the extraction efficiency, two or more extraction tanks 1 can be disposed in series or in parallel, two or more first desorption tank 2 I and second desorption tank 2 II can be disposed in parallel, two or more first purification column 3 I and second purification column 3 II can be disposed in series or parallel.

The upper parts of the first purification column 3 I and the second purification column 3 II are equipped with packing layers, which are stainless steel wire mesh, and the lower parts are cavities equipped with sight glass. The solvents turn into gas in the desorption tanks and then enter into the purification columns. After contacting with the packing layers, some of the objects which may be carried by the solvents will be condensed into liquid drops which will flow back into the first desorption tank 2 I, and the second desorption tank 2 II.

The above mentioned system can form two extraction loops: one loop is for the solvents which are in liquid state under normal temperature and normal pressure; another loop is for the solvents which are in gas state under normal temperature and normal pressure. During the extraction process, the solvents are keep circulating in the loops. As shown in the FIGURE, after passing through the high-pressure pump 7, the solvents were heated to a certain temperature in the heat exchanger 8 I, and then entered into the extraction tank 1 through Valve V1 for extraction. As the solvents entering into the extraction tank 1 are pure at any time, the penetration and dissolving capacity reaches the maximum. The solution after extraction entered through the pressure control valve V21 or the heat exchanger 8 II, the pressure control valve V22, into the desorption tank (2 I) or the desorption tank (2 II) for desorption. The objects after desorption were discharged from the first bottom valve 31 or the second bottom valve 32. The gaseous solvents were purified in the first purification column 3 I or the second purification column 3 II, and then entered into the first condenser 4 I or the second condenser 4 II for condensation. The condensed solvents returned to the store tank 5 I or the store tank 5 II for a temporary storage, and then entered into the high-pressure pump 7 through the valve V41 or the valve V42 for the next cycle.

The present invention may firstly go through loop 1: the extraction tank 1, the first pressure control valve V21, the first desorption tank 2 I, the first purification column 3 I, the first condenser 4 I, the first solvent tank 5 I, the first valve V41, the high-pressure pump 7, and the first heat exchanger 8, extracting materials by using solvents which are in gas state under normal temperature and normal pressure. After completion of extraction, it is immediately switched into loop 2: the extraction tank 1, the first heat exchanger 8 II, the second pressure control valve V22, the second desorption tank 2 II, the second purification column 3 II, the second condenser 4 II, the second solvent tank 5 II, the second valve V42, the high-pressure pump 7, and the heat exchanger 8 I, extracting materials by using solvents which are in gas state under normal temperature and normal pressure. The all-round extraction is performed in a set of devices, which provides convenience for the extraction of natural products.

The present invention is further elaborated through the following specific embodiments, but the invention is not limited to these particular embodiments.

Embodiment 1

(1) 7 kg camellia oil fruits (smashed to 20 mesh, dried to 5% or less of moisture content) was put into the extraction tank 1. N-butane was forced by the high-pressure pump 7 through the heat exchanger 8 I, and then went into the extraction tank 1 for extraction (temperature 45° C., pressure 0.5 MPa). The solvent together with oil from the extraction tank 1 went into the desorption tank 2 I for desorption (temperature 55° C., pressure 0.25 MPa). The whole extraction time was 50 min. 1.94 KG products were obtained from the first bottom valve V31 of the desorption tank 2 I. The verified extraction yield was 99.3%.

(2) After the oil extraction, it was switched to the loop: the extraction tank 1, the heat exchanger 8 II, the second pressure control valve V22, the second desorption tank 2 II, the second purification column 3 II, the second condenser 4 II, the second solvent tank 5 II, the second valve V42, the high-pressure pump 7, and the heat exchanger 8 I. Methanol was used for extraction. Extraction conditions were as follows: extraction temperature 55° C., extraction pressure 0.1 MPa, desorption temperature 65° C., desorption pressure −0.08 MPa, and extraction time 90 min. It was verified that almost all of the tea saponin in material has been removed.

Embodiment 2

(1) 10 kg castor seeds were pressed by hydraulic pressure to obtain 3 kg oil. The castor bean meal (smashed to 20 mesh, dried to 5% or less of moisture content) was put into the extraction tank 1. N-butane was forced by the high-pressure pump 7 through the first heat exchanger 8 I, and then went into the extraction tank 1 for extraction (temperature 80° C., pressure 1.0 MPa). The solvent together with oil from the extraction tank 1 went into the first desorption tank 2 I for desorption (temperature 60° C., pressure 0.3 MPa). The whole extraction time was 150 min. 1.97 KG products were obtained from the first bottom valve V31 of the first desorption tank 2 I. The verified extraction yield was 98.5%.

(2) After the oil extraction, it was switched to the loop: the extraction tank 1, the second heat exchanger 8 II, the second pressure control valve V22, the second desorption tank 2 II, the second purification column 3 II, the second condenser 4 II, the second solvent tank 5 II, the second valve V42, the high-pressure pump 7, and the heat exchanger 8 I. Methanol was used for extraction. Extraction conditions were as follows: extraction temperature 90° C., extraction pressure 0.6 MPa, desorption temperature 65° C., desorption pressure −0.08 MPa, and extraction time 120 min. It was verified that almost all of the ricin toxin (ricinine, ricin, allergen, lectin) in material have been removed.

Example 3

(1) The soybean residue after fermentation for soy sauce (7 kg, smashed to 40 mesh, dried to 5% or less of moisture content) was put into the extraction tank 1. Dimethylmethane was forced by the high-pressure pump 7 through the heat exchanger 8 I, and then went into the extraction tank 1 for extraction (temperature 45° C., pressure 1.2 MPa). The solvent together with oil from the extraction tank 1 went into the first desorption tank 2 I to for desorption (temperature 60° C., pressure 0.35 MPa). The whole extraction time was 65 min. 2.02 KG products were obtained from the first bottom valve V31 of the first desorption tank 2 I. The verified extraction yield was 99%.

(2) After the oil extraction, it was switched to the loop: the extraction tank 1, the second heat exchanger 8 II, the second pressure control valve V22, the second desorption tank 2 II, the second purification column 3 II, the second condenser 4 II, the second solvent tank 5 II, the second valve V42, the high-pressure pump 7, and the heat exchanger 8 I. Ethyl alcohol was used for extraction. Extraction conditions were as follows: extraction temperature 60° C., extraction pressure 0.1 MPa, desorption temperature 70° C., desorption pressure −0.08 MPa, and extraction time 120 min. 9.0 g products were obtained from the second bottom valve V32 of the desorption tank 2 II. The verified extraction yield was 94.7%.

What is claimed:

1. A multifunctional continuous phase transition extraction apparatus, comprising:
   an extraction system;
   a desorption system; and
   a solvent recovery system, wherein said extraction system comprises:
- a first heat exchanger; and
- an extraction tank, the first heat exchanger and the extraction tank are connected in series by a connecting pipe, on which a valve is disposed, wherein said desorption system comprises:
- a second heat exchanger;
- a first desorption tank;
- a second desorption tank;
- a first purification column; and
- a second purification column,
- wherein said second heat exchanger and the first desorption tank are connected in parallel to the extraction tank, said second desorption tank is connected to the second heat exchanger, said first purification column is connected to the first desorption tank, said second purification column is connected to the second desorption tank, a first bottom valve and a second bottom valve are disposed at the bottom of the first desorption tank and second desorption tank, respectively, a pipe connecting the first desorption tank and the extraction tank has a first pressure control valve, and a second pressure control valve is disposed on a pipe connecting the second heat exchanger and the extraction tank, and wherein said solvent recovery system comprises:
- a first condenser;
- a second condenser;
- a first solvent tank; and
- a second solvent tank,
- wherein the first solvent tank and the second solvent tank are connected in parallel to the first heat exchanger, a high-pressure pump is disposed on a pipe connecting the first heat exchanger to the first solvent tank and the second solvent tank, the first condenser is connected with the first solvent tank, the second condenser is connected with the second solvent tank, a first valve disposed on a pipe connecting the high-pressure pump to the first solvent tank, and a second valve disposed on a pipe connecting the high-pressure pump to the second solvent tank.

2. The multifunctional continuous phase transition extraction apparatus of claim 1, wherein, a liquid ring vacuum pump is disposed on the second solvent tank.

3. The multifunctional continuous phase transition extraction apparatus of claim 1, wherein, the extraction tank comprises a plurality of extraction tanks disposed in series or parallel, and each of the plurality of extraction tanks has a heating jacket.

4. The multifunctional continuous phase transition extraction apparatus of claim 1, wherein, the first desorption tank and the second desorption tank are disposed in parallel.

5. The multifunctional continuous phase transition extraction apparatus of claim 1, wherein, the first desorption tank and the second desorption tank have heating jacket structures, heating pipes inside, or external circulating heaters.

6. The multifunctional continuous phase transition extraction apparatus of claim 1, wherein, the first purification column and the second purification column are disposed in series or parallel.

7. The multifunctional continuous phase transition extraction apparatus of claim 1, wherein, the upper parts of both the first purification column and the second purification column have blow valves.

8. The multifunctional continuous phase transition extraction apparatus of claim 1, wherein, the first condenser and the second condenser are disposed in series or parallel with each other, and the first solvent tank and the second solvent tank are disposed in series or parallel with each other.

9. The multifunctional continuous phase transition extraction apparatus of claim 1, wherein, a packing layer is disposed in the upper part of each of the first purification column and the second purification column, the packing layer is stainless steel wire mesh, and the lower parts of the first purification column and the second purification column comprise cavities equipped with sight glasses.

10. The multifunctional continuous phase transition extraction apparatus of claim 1, wherein, the extraction tank, the first desorption tank, the second desorption tank, the first solvent tank and the second solvent tank have pressure vacuum gauges.

* * * * *